United States Patent
O'Regan et al.

(10) Patent No.: US 10,720,263 B2
(45) Date of Patent: Jul. 21, 2020

(54) ELECTRICAL CABLE SUPPORT ARRANGEMENT

(71) Applicant: Electrical Materials Company, Genoa City, WI (US)

(72) Inventors: Timothy M. O'Regan, Chicago, IL (US); Timothy J. O'Regan, Park Ridge, IL (US); Frank J. Wolfard, Batavia, IL (US); Michael F. O'Regan, Leland, IL (US)

(73) Assignee: ELECTRICAL MATERIALS COMPANY, Genoa City, WI (US)

( * ) Notice: Subject to any disclaimer, the term of this patent is extended or adjusted under 35 U.S.C. 154(b) by 154 days.

(21) Appl. No.: 14/068,886

(22) Filed: Oct. 31, 2013

(65) Prior Publication Data

US 2015/0114683 A1 Apr. 30, 2015

(51) Int. Cl.
*H01B 3/30* (2006.01)
*H02G 9/08* (2006.01)
*H02G 3/00* (2006.01)

(52) U.S. Cl.
CPC .............. *H01B 3/30* (2013.01); *H02G 3/263* (2013.01); *H02G 9/08* (2013.01)

(58) Field of Classification Search
CPC . H02G 9/06; H02G 3/263; H02G 3/08; H01B 3/30
USPC .......................................................... 174/174
See application file for complete search history.

(56) References Cited

U.S. PATENT DOCUMENTS

| | | | |
|---|---|---|---|
| 2,059,429 A | 10/1933 | Anderson | |
| 2,050,510 A * | 8/1936 | Thoms | F16L 3/221 |
| | | | 174/161 R |
| 3,471,109 A * | 10/1969 | Meyer | F16L 3/2332 |
| | | | 24/16 PB |
| 3,486,725 A | 12/1969 | Hidassy | |
| 3,632,070 A | 1/1972 | Thayer | |
| 3,672,615 A | 6/1972 | Fiorentino | |
| 3,731,347 A | 5/1973 | Caveney et al. | |

(Continued)

FOREIGN PATENT DOCUMENTS

EP 722062 B1 6/2000

OTHER PUBLICATIONS

International Search Report prepared by the ISA/US, and dated Feb. 9, 2015.

*Primary Examiner* — William H. Mayo, III
*Assistant Examiner* — Hiram E Gonzalez
(74) *Attorney, Agent, or Firm* — Greer Burns & Crain, Ltd.

(57) ABSTRACT

An electric cable saddle, or support, arrangement includes a housing having an upper recessed portion adapted to receive and support one or more electrical cables in a fixed, stable manner. Plural apertures disposed on upper portions of the housing on opposed sides of the cable(s) and aligned generally transverse to the length of the cable(s) are adapted to receive a flexible, high strength tie member, or strap, for securely attaching the cable(s) to an upper portion of the housing. A slot disposed in a lower portion of the housing and also aligned generally transverse to the length of the cables(s) is adapted to receive a structural support member for supporting the housing and cable(s). A retaining member also disposed in a lower portion of the housing is moveable adjacent to or into engagement with the support member for fixed positioning of the housing on the support member.

24 Claims, 4 Drawing Sheets

(56) References Cited

U.S. PATENT DOCUMENTS

| | | |
|---|---|---|
| 3,913,187 A | 10/1975 | Okuda |
| 3,913,876 A | 10/1975 | McSherry |
| 4,768,741 A * | 9/1988 | Logsdon .............. E21F 17/02 24/16 PB |
| 4,862,560 A | 9/1989 | Lichtenberg |
| 4,899,963 A * | 2/1990 | Murphy ................ F16L 3/137 24/16 R |
| 4,993,669 A | 2/1991 | Dyer |
| 5,119,528 A | 6/1992 | Ono et al. |
| 5,169,100 A | 12/1992 | Milcent et al. |
| 5,386,615 A | 2/1995 | Bernard |
| 5,653,409 A | 8/1997 | White, Jr. et al. |
| 5,740,994 A | 4/1998 | Laughlin |
| 6,196,751 B1 | 3/2001 | Khokhar |
| 6,198,042 B1 | 3/2001 | Huston |
| 6,533,226 B2 * | 3/2003 | Geiger .................. F16L 3/237 248/68.1 |
| 6,565,048 B1 | 5/2003 | Meyer |
| 6,636,679 B1 | 10/2003 | Mereness |
| 7,316,247 B2 | 1/2008 | Thompson |
| 7,429,020 B2 | 9/2008 | Huebner et al. |
| 7,674,982 B2 | 3/2010 | Cloutier et al. |
| 8,398,033 B2 | 3/2013 | Booth |
| 8,517,186 B1 | 8/2013 | McCoy |
| 8,991,774 B2 * | 3/2015 | Hajduch ................ B65D 63/00 248/220.22 |
| 2010/0096511 A1 | 4/2010 | Oliver |

* cited by examiner

ELECTRICAL CABLE SUPPORT ARRANGEMENT

FIELD OF THE INVENTION

This invention relates generally to the positioning and support of one or more electrical cables in a fixed, secure manner such as in an underground cable run which includes one or more manholes.

BACKGROUND OF THE INVENTION

Electric power cables are frequently routed underground, particularly in congested areas, using concrete enclosures, commonly known as manholes, located below grade for housing spliced cables that are continuous or form junctions for individual cable take offs. The cable junctions, or take offs, are commonly used for serving individual electric power users. In the early 1900's to on or about the year 2000, a lead sheath was installed by electrical utilities on multi-conductor power cables. This lead sheath formed part of the neutral system in multi-grounded high voltage electric power distribution systems. The lead sheath was electrically insulated from the electric cable steel supports in a manhole to prevent corrosion caused by neutral currents. Insulation was initially provided for the electric cable by porcelain cable saddles which supported the electrical cables. These porcelain cable saddles were very brittle and highly subject to impact damage or breakage. Environmental problems with porcelain manufacturing byproducts also inspired replacement of the porcelain insulated supports with injection molded products in the 1980's. In addition, the use of larger electrical cables carrying increased electrical load necessitated additional cable support. For example, with the increased electrical power a conducting cable undergoes increased contortion as it expands and contracts greater distances along its length with load cycles and heavy fault currents. This expansion occurs primarily in manholes, with the cables applying upward and sideways pressure on the cable saddle. In some cases, cotter pins were used to secure the support saddle to a support bracket. However, the cotter pins were difficult to install in the steel cable supports, and thus were frequently not properly installed, and cables and splices were subject to falling off of the metal cable support resulting in cable joint damage, failure, subsequent service interruptions, and costly repairs. In the 1980's, cable joint support saddles were introduced and molded from high molecular weight polyethylene (HMWPE).

The present invention addresses the aforementioned limitations of the prior art by providing for the safe and fixed positioning of one or more electrical cables in a manhole of an underground cable run using high strength, insulated cable saddles for supporting the cable(s) and/or splices or junctions of the cable(s).

OBJECTS AND SUMMARY OF THE INVENTION

Accordingly, it is an object of the present invention to provide for the fixed, secure positioning and support of one or more electrical cables in an underground manhole.

It is another object of the present invention to maintain electric power cables in fixed position and orientation while accommodating longitudinal contraction and expansion of the cables arising from changes in electric load.

Yet another object of the present invention is to provide support, fixed positioning, insulation and protection for power cable joint and splice arrangements in a closed environment such as a manhole.

A further object of the present invention is to provide an insulated, rugged, easily installed and reliable mounting/positioning arrangement for one or more electric power cables, as well as for multi-cable junctions and splices, which is particularly adapted for use in closed, congested installations.

A still further object of the present invention is to provide a high strength, electrically insulated, rugged electric power cable support saddle which is fixedly attached to the cable, insulates the cable from its support structure, and maintains cable connections such as splices and junctions and preserves the joint connection.

Another object of the present invention is to provide a rectangular-shaped support saddle for electrical cables which is adapted for permanent attachment to the support of the cables by applying slight pressure to a slider retainer while being capable of unlatching by tapping on the side of the support saddle.

The present invention contemplates a saddle arrangement for engaging, electrically insulating, and maintaining one or more electrical cables in fixed position on a support member such as in an underground manhole. The saddle arrangement includes a housing comprised of a high strength, lightweight, insulating plastic and having an upper recessed portion adapted for receiving and supporting one or more electrical cables. The inventive saddle arrangement further includes a tie arrangement coupled to an upper portion of the housing and spanning the housing's upper recessed portion for engaging and retaining one or more electrical cables on the housing within its upper recessed portion. The inventive saddle further includes a retaining arrangement disposed in a lower portion of the housing and including a slot adapted to receive the support member in a tight-fitting manner and a moveable member adapted for positioning across the slot and in engagement with the support member for fixedly attaching the housing and one or more electrical cables disposed thereon to the support member in a removable manner.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1b is a side elevation view of the electrical cable support saddle illustrated in FIG. 1a;

FIG. 2b is a side elevation view of the prior art electrical cable joint support saddle shown in FIG. 2a.

FIG. 3b is a longitudinal sectional view of the manhole with cable saddles with high voltage cables shown in FIG. 3a;

FIG. 4b is a transverse sectional view shown partially in phantom of the inventive electrical cable support saddle shown in FIG. 4a;

DETAILED DESCRIPTION OF THE PREFERRED EMBODIMENTS

Figure 1A:
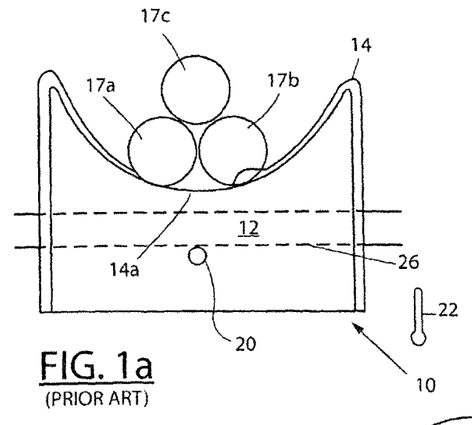
FIG. 1a is an end-on view of a prior art electrical cable support saddle.
Figure 1B:
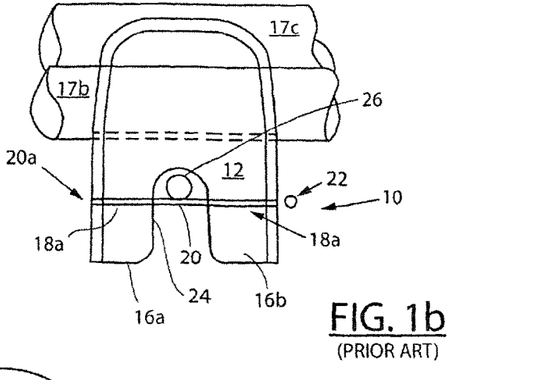
Figure 2A:
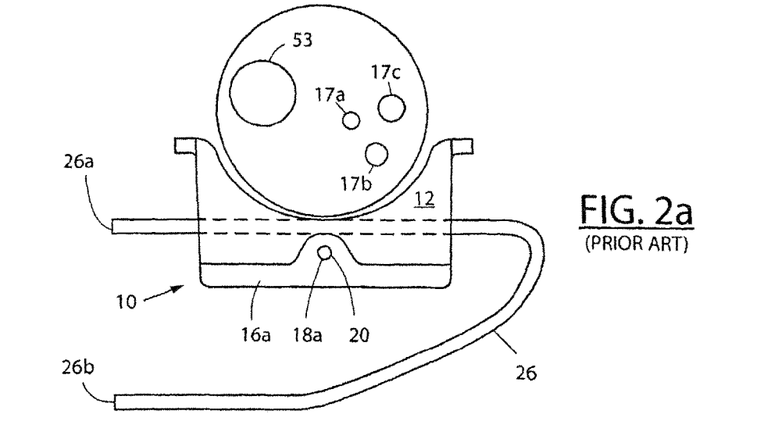
FIG. 2a is an end-on view of a prior art electrical cable joint support saddle shown with three 1/c electrical cables and a 3/c cable thereon, and also illustrating the support saddle attached to a conventional support structure.
Figure 2B:
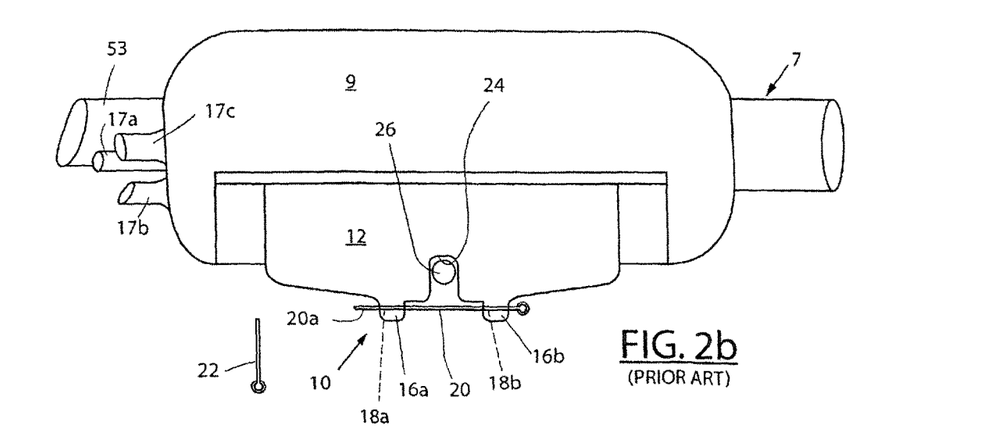

Referring to FIGS. 1a and 2b, there are respectively shown end-on and side elevation views of a prior art electrical cable saddle mount 10. FIGS. 2a and 2b are respectively end-on and side elevation views of the prior art cable saddle mount 10 illustrating additional details of the invention. Prior art cable saddle mount 10 is typically comprised of porcelain primarily for its insulating characteristics and includes a generally rectangular housing 12 having an upper portion 14 which includes a recessed portion 14a. Recessed portion 14a is generally semi-circular in shape and is adapted to receive and support one or more electrical cables, where three such cables are shown as elements 17a, 17b and 17c in FIG. 1a, with only cables 17b and 17c illustrated in FIG. 1b. The three cables form the basis for current three phase electric power distribution systems. The center axis of the cable saddle mount's recessed upper portion 14a is aligned parallel with the respective lengths of the three electrical cables 17a, 17b and 17c. The three electrical 1/c single conductor cables 17a, 17c and 17b are wrapped around each other along their respective lengths in spiral manner so as to cancel out the magnetic fields within and about each of the three electrical cables. This arrangement, which is known as a three single conductor main feeder cable, reduces the capacitance and inductance of the conductor arrangement for improved and more efficient electric power transmission.

The prior art cable saddle joint mount's housing 12 includes first and second spaced lower flanges 16a and 16b each aligned generally transverse to the lengths of the three cables 17a, 17b and 17c and having a respective aperture, or slot, 18a and 18b extending threrethrough. The first and second apertures 18a, 18b respectively disposed within the first and second spaced lower flanges 16a, 16b are in mutual alignment and are adapted to receive a retaining pin 20 as shown in FIG. 1b. Also disposed on a lower portion of the cable saddle mount's housing 12 is an elongated, linear slot 24 which is also aligned generally transverse to the lengths of the three electrical cables 17a, 17b and 17c and is adapted to receive a structural support member 26. Support member 26 is attached to another structural member (not shown) in the manhole through which the three electrical cables 17a, 17b and 17c pass and within which the cable saddle mount 10 is intended for use. Support member 26 is typically comprised of a high strength steel, with the porcelain cable saddle mount 10 insulating the three electrical cables 17a, 17b from the support member. Retaining pin 20 includes a slot, or aperture, 20a adjacent one end thereof which is adapted to receive a cotter pin 22 for maintaining the retaining pin within the aligned apertures 18a, 18b of the first and second spaced lower flanges 16a, 16b of the cable joint saddle mount's housing 12. It is in this manner that the cable saddle mount 10 and the three electrical cables 17a, 17b and 17c disposed thereon are maintained in fixed position on support member 26. While the prior art cable saddle mount 10 is shown in FIGS. 1a and 1b as providing support for three electrical cables 17a, 17b and 17c, this type of cable joint saddle mount is also used to support trifurcating joints where a single incoming electrical cable is modified to form a joint for providing a pair of outgoing cables, with one of the outgoing cables directed to an end user of electric power in the electric power distribution network as described in the following paragraph.

Figure 3A:
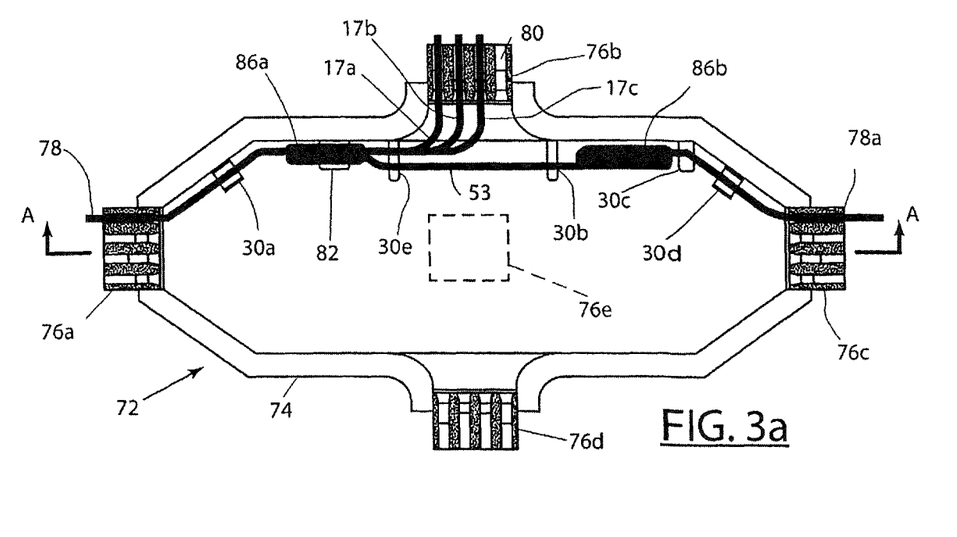
FIG. 3a is a side plan view of a conventional manhole illustrating the use of cable saddles with high voltage cables.
Figure 3B:
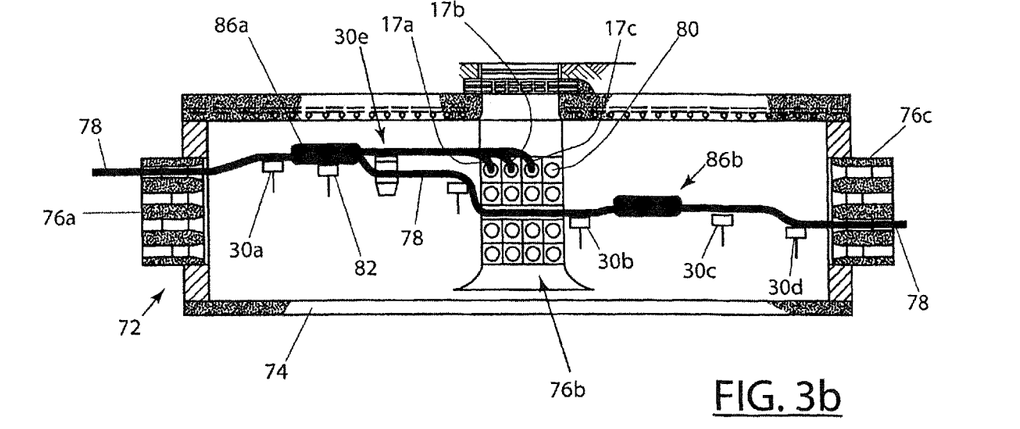

Referring to FIG. 3a, there is shown a sectional view of a conventional manhole 72 within which the electrical cable support arrangement of the present invention is particularly adapted for use. FIG. 3b is a sectional view of the manhole 72 taken along site line A-A in FIG. 3a. Manhole 72 includes a hollow housing 74 typically comprised of concrete. Housing 74 includes on its outer surface plural conduit, or duct, sections 76a-76e, where the fifth duct section 76e is shown in dotted line form. Each of the conduit sections 76a-76e includes plural ducts 80, each of which is typically coupled to a respective conduit and is adapted to receive a respective electrical cable, or cables, as shown for the case of the second conduit duct section 76b having plural spaced ducts 80, where three of the ducts provide exits from the manhole's housing 74 for three 1/c single conductor electrical cables 17a, 17b and 17c. A 3/c three conductor input cable 78 is routed through a duct in the first conduit duct section 76a into the manhole's housing 74. Within manhole housing 74 are plural cable saddle mounts 30a-30e in accordance with the present invention. Each of the cable saddle mounts 30a-30d is securely affixed by conventional means such as mounting bolts (not shown for simplicity) to the inner wall of the manhole's housing 74 and each is adapted to engage and provide support for one or more electrical cables as described below. A first cable saddle mount 30a directs the 3/c electrical input cable 78 within housing 74 to a first standard, or conventional, 3/c cable splice joint 86a, which is engaged and supported by a conventional cable support arrangement as illustrated in FIGS. 2a and 2b. The 3/c input cable 78 is spliced so as to form three additional 1/c single conductor electrical cables 17a, 17b and 17c. As described above, each of the three 1/c electrical cables 17a, 17b and 17c is routed out of the manhole's housing 74 via a respective duct 80 within the manhole's second conduit section 76b. Electrical cable 78 also exits the first cable splice joint 86a. The 3/c electrical cable 78 and the three 1/c electrical cables 17a, 17b and 17c are engaged and supported by cable saddle mount 30e in accordance with the embodiment of the present invention illustrated in FIG. 7. Electrical cable 78 is routed to a second cable splice joint 86b and is supported on both sides of the second cable splice joint by means of second and third cable saddle mounts 30b and 30c of the present invention. The electrical cable 78 is then routed to and supported by a fourth cable saddle mount 30d in accordance with the present invention as it is provided to a third conduit duct section 76c for exiting the manhole's housing 74. While only a single electrical input cable 78 and only three 1/c single conductor electrical cables 17a, 17b and 17c are shown in FIGS. 3a and 3b, it can be appreciated from these figures that a larger number of input electrical cables and spliced output electrical cables can easily be accommodated by the configuration of manhole's housing 74.

Figure 4A:
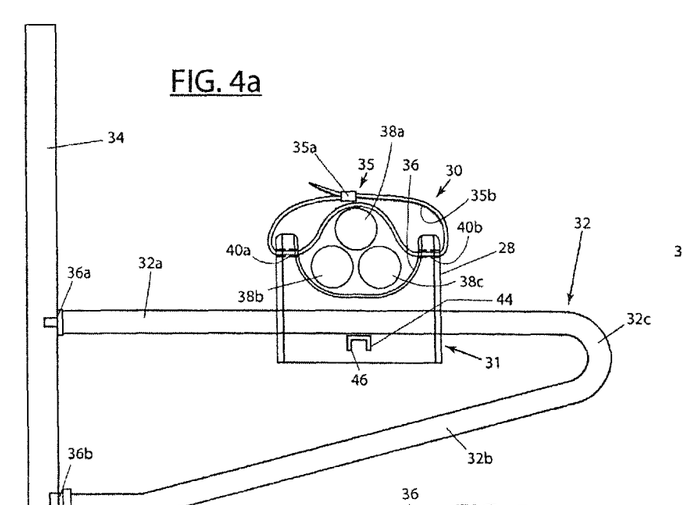
FIG. 4a is a longitudinal sectional view of an electrical cable support saddle attached to a support member in accordance with the present invention.

Referring to FIGS. 4a, 4b, 5 and 6, there are shown various views of a cable saddle mount 30 in accordance with the principles of the present invention. FIGS. 4a and 6b are respectively end-on and side elevation views shown partially in phantom of the inventive cable saddle mount 30. Referring specifically to FIG. 4a, the cable saddle mount 30 is shown attached to an upper portion 32b of a support member 32. Support member 32 is attached to a structural member 34 such as in a manhole (not shown) by means of first and second couplers 36a and 36b. Support member 32 includes its upper portion 32a coupled to the structural member 34 by means of first coupler 36a. Support member 32 further includes a lower portion 32b attached to the structural member 34 by means of second coupler 36b. Support member 32 is conventional in design and function and is of unitary construction, with its upper and lower portions 32a, 32b linked by an integral coupling portion 32c. Structural member 34 and support member 32 are typically comprised of a high strength metal such as steel.

Cable saddle mount 30 includes a generally rectangular housing 31 preferably comprised of an electrically insulating and flame retardant material such as acrylonitrile butadiene styrene (ABS), including inner ribs for increased strength. Cable saddle mount 30 includes a generally semicircular upper recessed portion 36 which is adapted to receive and support plural electrical cables, such as three electrical cables 38a, 38b and 38c shown in FIG. 4a.

Disposed in upper, opposed lateral portions of the cable saddle mount's housing 31 are first and second aligned slots, or apertures, 40a and 40b. Each of the aligned slots 40a, 40b is disposed adjacent a respective lateral portion of the cable saddle mount's upper recessed portion 36. Each of the aligned slots 40a, 40b is adapted to receive a cable tie 35 inserted therethrough. Cable tie 35 includes a receptacle housing 35a disposed adjacent a first end thereof, as well as plural spaced teeth 35b, or projections, 35b disposed in a spaced manner along a surface of the cable tie. Receptacle housing 35a is adapted to receive a second opposed end of the cable tie 35 and to allow for the drawing of the cable tie through the receptacle housing. An inner portion of the receptacle housing 35a is provided with a complementary set of teeth (not shown in the figure for simplicity) which are adapted to engage teeth 35b so as to prevent withdraw of the cable tie from its receptacle housing. As shown in FIG. 4a, cable tie 35 is inserted through aligned apertures 40a and 40b and into engagement with one or more of the three electrical cables 38a, 38b and 38c. With the cable tie 35 drawn tightly about the three electrical cables 38a, 38b and 38c, the cables are securely maintained in fixed position within the cable saddle mount's upper recessed portion 36. Cable tie 35 is preferably comprised of a high strength polypropylene to accommodate changes in the temperature of the electrical cables with changes in load current which gives rise to expansion and contraction of the electrical cables along the length of each of the cables resulting in cable contortions and changes in position. The high strength of the cable tie 35 resists these tendencies of the electrical cables to move with changes in the electrical load current so as to maintain each of the electrical conductors 38a, 38b and 38c in secure, fixed position on cable saddle mount 30.

Figure 4B:
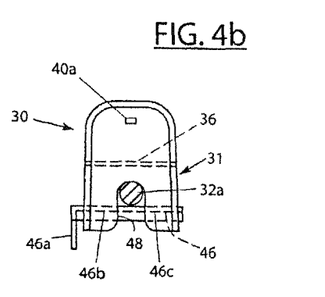
Figure 5:
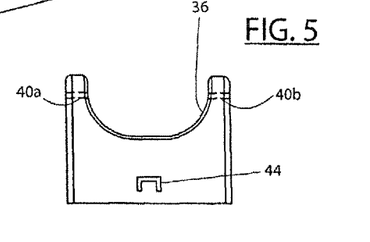
FIG. 5 is a longitudinal sectional view of the inventive electrical cable support saddle.
Figure 6:
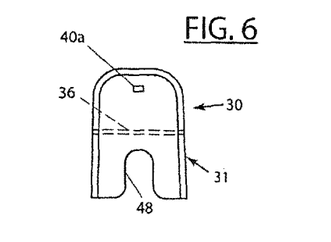
FIG. 6 is a transverse sectional view of the inventive electrical cable support saddle.

Disposed in a lower portion of the cable saddle mount's housing 31 is a first elongated, generally linear lower slot 48 which extends the width of the housing. Lower slot 48 is adapted to receive in tight-fitting engagement the upper portion 32a of support member 32 as shown in FIGS. 4a and 4b. As described above, support member 32 is typically comprised of a high strength metal such as steel and provides support for the cable saddle mount 30. Support member 32 including its upper and lower portions 32a and 32b are aligned generally transverse to the lengths of the three electrical cables 38a, 38b and 38c.

Also disposed in a lower portion of the cable saddle mount's housing 31 and aligned generally transverse to the first lower slot 48 is a second lower slot 44. Second lower slot 44 is adapted to receive in a sliding manner an elongated, generally linear member 46. When slide member 46 is inserted in the second lower slot 44, the slide member is disposed below the upper portion 32a of support member 32 for securely attaching in a fixed manner cable saddle mount 30 to the support member. Slide member 46 is also preferably comprised of ABS and has a generally channel-shaped cross section so as to match the channel-shaped cross section of the second lower slot 44 within the cable saddle mount's housing 31. In addition, one end of an elongated, linear portion of the moveable slide member 46 is provided with a handle 46a to facilitate insertion and removal of the slide member from the second lower slot 44. Slide member 46 is also provided with first and second spaced locking tabs 46b and 46c to ensure that the slide member is easily and permanently affixed to the cable saddle mount's housing 31 when installed and is not subject to being misplaced when not in use, or prior to installation.

Figure 7:
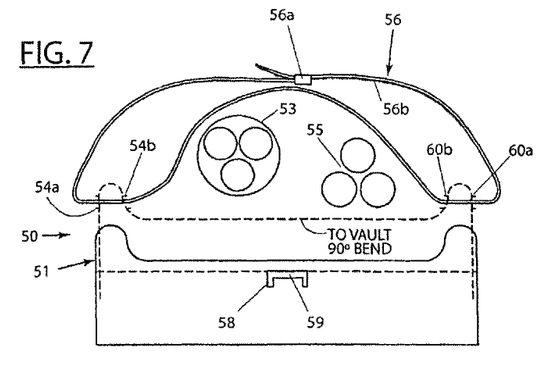
FIG. 7 is a transverse sectional view of another embodiment of an electrical cable support saddle in accordance with the present invention.
Figure 8:
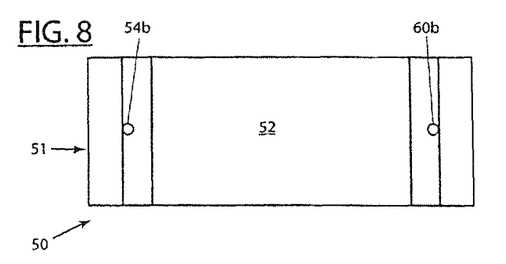
FIG. 8 is a top plan view of the electrical cable support saddle shown in FIG. 7.
Figure 9:
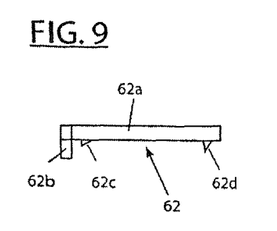
FIG. 9 is a side elevation view of a slide member for attaching the inventive electrical cable support saddle to a support member.
Figure 10:
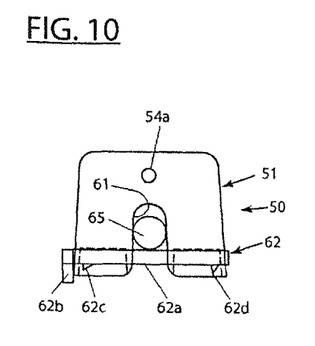
FIG. 10 is a side elevation view of the electrical cable support saddle shown in FIG. 7 illustrating the manner in which the support saddle is securely attached to a support member.

Referring to FIGS. 7-10, there are shown various views of another embodiment of a cable saddle mount 50 in accordance with the present invention. FIGS. 8 and 10 are respectively top plan and side elevation views of the inventive cable saddle mount 50. FIG. 7 is a front, or end-on, view of cable saddle mount 50 shown engaging and supporting a first through 3/c cable 53 and a second branch cable 55 formed by splicing the through cable. The second branch cable 55 typically undergoes a 90° bend, or turn, before exiting the manhole within which the splice is located for providing electric power to a user in the electric power distribution network. As in the previously described embodiment, the cable saddle mount's housing 51 includes an upper recessed portion 52 adapted to engage and support the first through cable 53 and the second branch cable 55. Upper spaced, lateral portions of the cable saddle mount's housing 51 respectively include a first pair of aligned apertures 54a, 54b and a second pair of aligned apertures 60a, 60b. All of the aforementioned apertures are in common alignment and are adapted to receipt a flexible cable tie 56 having a receptacle housing 56 dispose on one end thereof and plural spaced teeth 56b disposed along a portion of the length of the cable tie as in the previously described embodiment. Also as in the previously described embodiment, housing 51 includes a first lower slot 61 adapted to receive in a tight-fitting manner a support member 65. Housing 51 further includes a second lower slot 58 oriented generally transverse to first lower slot 61 and adapted to receive and engage a sliding member 59 for securely and fixedly maintaining cable saddle mount 50 on support member 65. Also as in the previously described embodiment, slide member 62 has a generally channel-shaped cross section to match that of the second lower slot 58 and includes an elongated, generally linear shaft 62a having a handle 62b disposed on one end thereof and a pair of spaced locking tabs 62c and 62d as in the previously described embodiment and as shown in FIGS. 9 and 10. The cable saddle mount 50 embodiment shown in FIGS. 7-10 differs from the earlier described cable saddle mount 30 embodiment in that the upper recessed portion 52 of the cable saddle mount's housing 51 has a generally flat inner portion for supporting the first through 3/c cable 53 and the second 1/c branch cables 55. The flatness of the upper recessed portion 52 of housing 51 is adapted for engaging and supporting a pair of electrical cable runs which are laterally spaced from one another as shown in FIG. 7. The flatness of the cable saddle mount's upper recessed portion 52 also allows for the required support of increased numbers of electrical cables emanating from an adjacent trifurcating joint as shown in FIGS. 2*a* and 2*b*.

While particular embodiments of the present invention have been described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper prospective based on the prior art.

The invention claimed is:

1. An electrically insulated saddle arrangement for maintaining one or more electrical utility power distribution cables in fixed position on a support member, said saddle arrangement comprising:

a housing comprised of a high strength, lightweight plastic and having an upper recessed curvilinear portion adapted for receiving one or more electrical cables, wherein said upper recessed portion of said housing is defined by a single flat inner portion for receiving and supporting one or more electrical cables and first and second opposed, upwardly extending outer lateral portions each disposed on an upper portion of said housing and including one or more respective aligned apertures, each defined by a perimeter, wherein said single flat inner portion extends from said first outer lateral portion to said second outer lateral portion, wherein said one or more aligned apertures are positioned above and spaced apart from said single flat inner portion of said housing, such that a section of said outer lateral portion extends upwardly between said single flat inner portion and a lowermost point of said perimeter of said aperture associated therewith, and further wherein said aligned apertures are spaced apart from an uppermost edge of said outer lateral portion associated therewith such that a segment of said outer lateral portion is between an uppermost point of said perimeter of said aligned aperture and said uppermost edge of said outer lateral portion associated therewith;

a tie arrangement including an elongated, flexible tie member attached to said aligned apertures in said first and second opposed, upwardly extending outer lateral portions of said housing for retaining said elongated, flexible tie member, said tie member spanning the housing's upper recessed curvilinear portion for engaging and maintaining the one or more electrical cables in fixed position on said housing; and a retaining arrangement disposed on a lower portion of said housing and including first and second slots aligned transverse to one another, wherein said first slot is adapted to receive the support member and a moveable member disposed in said second slot and adapted for positioning across said first slot and in engagement with the support member for fixedly attaching said housing to the support member while allowing the one or more electrical cables to move in a sliding manner along their respective lengths in the housing's upper recessed curvilinear portion.

2. The saddle arrangement of claim 1, wherein said housing is comprised of acrylonitrile butadiene styrene (ABS).

3. The saddle arrangement of claim 1, wherein said tie member includes plural spaced teeth along the length thereof and a receptacle housing disposed on a first end thereof and adapted to receive a second opposed end of said tie member and engage said spaced teeth for securely maintaining said tie member attached to said housing and in engagement with one or more of the electrical cables.

4. The saddle arrangement of claim 1, wherein the length of the upper recessed curvilinear inner portion of said housing is aligned with and extends along a portion of the length of said one or more electrical cables.

5. The saddle arrangement of claim 1, wherein the support member and said first slot disposed in a lower portion of said housing adapted to receive said support member are aligned generally transverse to the length of said one or more electrical cables.

6. The saddle arrangement of claim 1, wherein said moveable member is slideable between a first position disposed in a spaced manner from said first slot for allowing said housing to be attached to or removed from the support member, and a second position wherein said moveable member is disposed across said first slot and said support member for preventing removal of said housing from the support member.

7. The saddle arrangement of claim 1 wherein said at least one second slot and said moveable member have complementary cross-sectional shapes that are sized so that said moveable member is received in said at least one second slot in a tight-fitting manner.

8. The saddle arrangement of claim 7, wherein said at least one second slot and said moveable member are generally channel-shaped in cross-section.

9. The saddle arrangement of claim 7, wherein said moveable member includes an elongated, linear shaft adapted for insertion in said at least one second slot and a handle for gripping disposed on an end of said shaft.

10. Apparatus for securely mounting one or more electrical utility power distribution cables to a structural member, said apparatus comprising:

a housing having an upper, recessed curvilinear portion and first and second upraised, spaced portions disposed on respective ends of said upper recessed portion, wherein said upper recessed portion of said housing includes a single flat inner portion for receiving and supporting said one or more electrical utility power distribution cables and wherein said first and second upraised, spaced portions of said upper, recessed curvilinear portion include respective aligned apertures, each defined by a perimeter, wherein said single flat inner portion extends from said first upraised, spaced portion to said second upraised, space portion, wherein said aligned apertures are each positioned above and spaced apart from said single flat inner portion of said housing, such that a section of an associated one of said upraised, spaced portions extends upwardly between said single flat inner portion and a lowermost point of said perimeter of said aligned aperture associated therewith, and further wherein said aligned apertures are spaced apart from an uppermost edge of said upraised, spaced portion associated therewith such that a segment of said upraised, spaced portion is between an uppermost point of said perimeter of said aligned aperture and said uppermost edge of said upraised, spaced portion associated therewith, said housing further having a lower portion including one or more first apertures and one or more second apertures aligned transverse to one another;

a support member attached to the structural member and adapted for positioning in said one or more first apertures for providing support for said housing;

a retaining member positioned in the housing's one or more second apertures and disposed adjacent to, or in sliding contact with, said support member for preventing removal of said housing from said support member; and an elongated, flexible member having a locking structure disposed in a spaced manner along at least a portion of the length of said elongated, flexible member, wherein said elongated, flexible member is adapted for coupling to said housing by insertion through the aligned apertures in the housing's first and second upraised, spaced portions so as to extend across the housing's upper, recessed curvilinear portion and engage and maintain the one or more electrical utility power distribution cables securely in position in the upper, recessed curvilinear portion of said housing.

11. The apparatus of claim 10, wherein said one or more first apertures are in the form of first plural aligned slots each adapted to receive said support member.

12. The apparatus of claim 11, wherein said retaining member is an elongated, linear member and is adapted for positioning within said one or more second apertures in a removable manner.

13. The apparatus of claim 12, wherein said retaining member includes an elongated, generally linear shaft disposed adjacent to, or in contact with, said structural member.

14. The apparatus of claim 13, wherein said retaining member further includes a handle disposed on an end of said linear shaft to facilitate manual insertion and removal of said retaining member into and out of the housing's one or more second apertures.

15. The apparatus of claim 12, wherein said support member is unitary in composition and includes a first generally horizontal, elongated section inserted in said one or more first apertures, and a first end portion attached to the support structure, said support member further including a second inclined section extending from said first elongated section and having a second end portion attached to said support structure.

16. The apparatus of claim 11, wherein said first plural aligned slots are aligned generally transverse to the length of the electrical cables.

17. The apparatus of claim 16, wherein said one or more second apertures are aligned generally parallel to the length of the electrical cables.

18. The apparatus of claim 10, wherein the upper recessed portion of said housing and said elongated, flexible member are aligned generally transverse to the length of the electrical cables.

19. The apparatus of claim 10, wherein said housing further includes plural aligned third apertures through which said elongated, flexible member is inserted.

20. The apparatus of claim 19, wherein said third apertures are disposed in upper, opposed lateral portions of said housing and are aligned generally transverse to the length of the electrical cables.

21. The apparatus of claim 10, wherein said elongated, flexible member is comprised of a high strength polypropylene.

22. The apparatus of claim 10, wherein said housing is comprised of acrylonitrile butadiene styrene (ABS).

23. A system including an electrically insulated saddle arrangement for maintaining one or more electrical utility power distribution cables in fixed position on a support member, said system comprising:

at least one electrical utility power distribution cable;

a housing comprised of a high strength, lightweight plastic and having an upper recessed curvilinear portion adapted for receiving said at least one electrical utility power distribution cable, wherein said upper recessed portion of said housing is defined by an inner portion that receives and supports said at least one electrical utility power distribution cable and first and second opposed, upwardly extending outer lateral portions each disposed on an upper portion of said housing and including one or more respective aligned apertures, wherein said one or more aligned apertures are positioned above and spaced apart from said inner portion;

a tie arrangement including an elongated, flexible tie member attached to said aligned apertures in said first and second opposed, upwardly extending outer lateral portions of said housing for retaining said elongated, flexible tie member, said tie member spanning the housing's upper recessed curvilinear portion and engaging and maintaining said at least electrical utility power distribution cable in fixed position on said housing; and a retaining arrangement disposed on a lower portion of said housing and including first and second slots aligned transverse to one another, wherein said first slot is adapted to receive the support member and a moveable member disposed in said second slot and adapted for positioning across said first slot and in engagement with the support member for fixedly attaching said housing to the support member while allowing said at least one or electrical utility power distribution cable to move in a sliding manner along its respective length in the housing's upper recessed curvilinear portion, wherein said elongated, flexible tie member includes an inner segment extending between innermost portions of said aligned apertures, and an outer segment extending between outermost portions of said aligned apertures, and further wherein said inner and outer segments of said elongated, flexible tie member are both positioned above an uppermost one of said at least one electrical utility power distribution cables, such that all of said electrical utility power distribution cables are seated between said inner and outer segments of said flexible tie member and said inner portion of said upper recessed portion of said housing, and wherein said one or more aligned apertures are each defined by a perimeter, and further wherein said aligned apertures are spaced apart from an uppermost edge of said outer lateral portion associated therewith such that a segment of said outer lateral portion is between an uppermost point of said perimeter of said aligned aperture and said uppermost edge of said outer lateral portion associated therewith, and still further wherein said inner portion extends from said first outer lateral portion to said second outer lateral portion and a segment of each of said outer lateral portions extends upwardly between said inner portion and a lowermost point of said perimeter of said aperture associated therewith.

24. The system according to claim 23, wherein said aligned apertures are located above a majority, when considered in the thickness direction, of a lowermost one of said at least one electrical utility power distribution cables seated upon said inner portion of said housing.

* * * * *